United States Patent
Agrawal

(10) Patent No.: US 9,313,327 B2
(45) Date of Patent: Apr. 12, 2016

(54) METHOD AND APPARATUS FOR MANAGING CONTACT INFORMATION

(71) Applicant: Motorola Mobility LLC, Chicago, IL (US)

(72) Inventor: Amit Kumar Agrawal, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 18 days.

(21) Appl. No.: 14/275,030

(22) Filed: May 12, 2014

(65) Prior Publication Data

US 2015/0326720 A1 Nov. 12, 2015

(51) Int. Cl.
*H04M 3/42* (2006.01)
*H04M 3/00* (2006.01)
*H04M 1/00* (2006.01)
*H04M 3/44* (2006.01)

(52) U.S. Cl.
CPC ..................................... *H04M 3/44* (2013.01)

(58) Field of Classification Search
CPC ...... G06Q 10/10; G06Q 10/107; H04L 12/58; H04L 12/581; H04L 12/589; H04L 29/12047; H04L 51/04; H04L 51/046; H04L 51/16; H04L 51/36; H04L 61/1547; H04L 61/1594; H04M 1/72552; H04W 4/08; H04W 4/12; H04W 4/14
USPC ................. 455/414.1, 418, 466, 556.1, 556.2; 379/85, 121.04–131, 265.01–266.1
See application file for complete search history.

(56) References Cited

U.S. PATENT DOCUMENTS

| | | | |
|---|---|---|---|
| 8,311,580 B2 | 11/2012 | Koberg et al. | |
| 8,335,543 B1 * | 12/2012 | Thenthiruperai et al. | 455/567 |
| 8,620,909 B1 | 12/2013 | Rennison | |
| 8,750,851 B2 * | 6/2014 | Le Thierry d'Ennequin | 455/418 |
| 2004/0093331 A1 | 5/2004 | Garner et al. | |
| 2009/0036163 A1 * | 2/2009 | Kimbrell | 455/558 |
| 2009/0112804 A1 * | 4/2009 | Quiroz-Castro | 707/3 |
| 2009/0300123 A1 * | 12/2009 | Tsubouchi | 709/206 |
| 2010/0076926 A1 * | 3/2010 | Lecciso et al. | 707/610 |
| 2010/0199287 A1 | 8/2010 | Boda et al. | |
| 2011/0034156 A1 * | 2/2011 | Gatti et al. | 455/415 |
| 2013/0290096 A1 * | 10/2013 | Lizotte, III | 705/14.45 |
| 2014/0188810 A1 * | 7/2014 | Kau et al. | 707/668 |

OTHER PUBLICATIONS

Giladfit, "Temporary Contacts", Google Play, Mar. 13, 2014, 4 pages.

* cited by examiner

*Primary Examiner* — Rafael Pérez-Gutiérrez
*Assistant Examiner* — Mark G Pannell
(74) *Attorney, Agent, or Firm* — Shumaker & Sieffert, P.A.

(57) ABSTRACT

A method and apparatus for managing contact information includes an electronic device detecting 302 a pair of communications by the electronic device related to a contact and parsing 304 at least one of the communications in the pair of communications to determine a time duration for a record for the contact. The method further includes the electronic device setting 306 a time duration element for the record based on the time duration to cause deletion of the record when the time duration has elapsed.

19 Claims, 13 Drawing Sheets

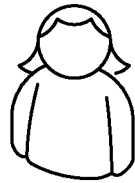

HEATHER WATSON
HEATHER5@YAHOO.COM
THU, FEB 21, 2014, 5:32 PM
TO: ABHISHEK PATEL

↙700

HI ABHI,

I FINALLY LANDED IN MUMBAI LAST NIGHT. MY TEMPORARY NUMBER WHILE I'M HERE FOR THE NEXT FOUR WEEKS IS 91-22-2572-5962. SEE YOU SOON.       ↖704                     ↖702

HEATHER

*FIG. 7*

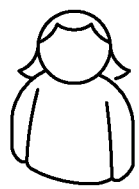

HEATHER WATSON
HEATHER5@YAHOO.COM
THU, FEB 16, 2014; 2:16 PM
TO: ABHISHEK PATEL

↙800

HI ABHI,

I GOT THE NEW JOB I INTERVIEWED FOR IN CHICAGO LAST WEEK. STARTING MONDAY, MY NUMBER WILL BE
802— 312-317-5000 EXTENSION 174, AND MY E-MAIL WILL BE HWATSON@STAR-DYNAMICS.COM.
                                      ↖804
BEST,
HEATHER

*FIG. 8*

METHOD AND APPARATUS FOR MANAGING CONTACT INFORMATION

FIELD OF THE DISCLOSURE

The present disclosure relates generally to an electronic device managing contact information and more particularly to the electronic device determining and setting time durations for contact information based on communications by the electronic device.

BACKGROUND

Over recent years, significant advancements have occurred with electronic communication devices. As technology advances, such devices are being made smarter and more portable with greater battery life. As a result, such devices are carried more often and used more frequently for all types of communications that include business and personal communications involving e-mails, text messages, Internet postings, and voice calls.

To organize contact information for contacts with which a device communicates, the contact information is stored in one or more records of a contacts table for the device. Without an effective means to manage such records, however, they can accumulate and become dated or even invalid. A user might no longer communicate with or even remember a contact associated with an old contact record stored on the device. In some instances contact information might have changed since the contact record was last updated. Compounding the problem is that being vigilant about managing contact records is not always convenient for a user of an electronic communication device.

BRIEF DESCRIPTION OF THE FIGURES

The accompanying figures, where like reference numerals refer to identical or functionally similar elements throughout the separate views, form part of the specification and illustrate embodiments of the claimed invention.

FIG. 7 is an illustration of an e-mail with contact information for a record for a contact in accordance with some embodiments of the present teachings.

FIG. 8 is an illustration of an e-mail with contact information for records for a contact in accordance with some embodiments of the present teachings.

Figure 1:
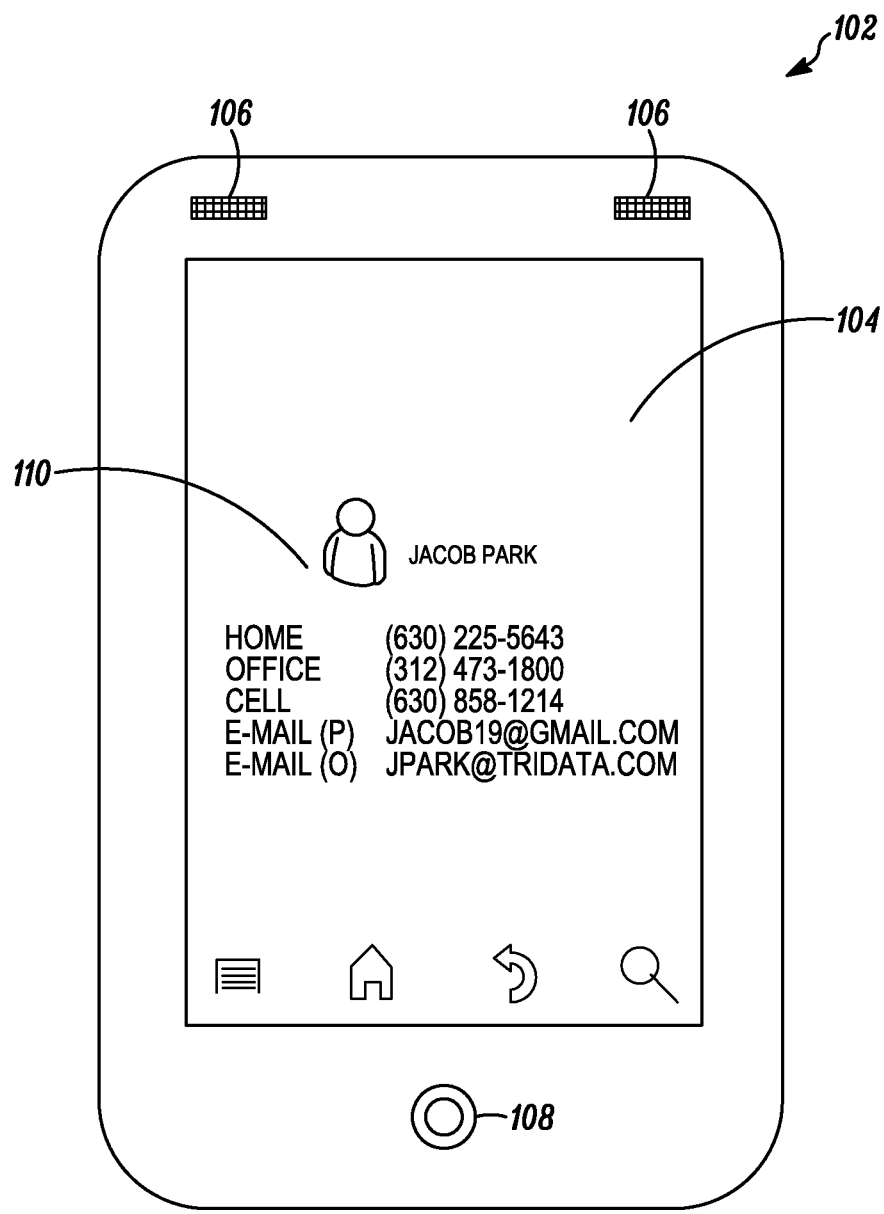
FIG. 1 is an illustration of an electronic device in accordance with some embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and apparatus for managing contact information whereby an electronic device parses communications to determine and set time durations for records of contacts. In accordance with the teachings herein, a method performed by an electronic device for managing contact information includes the electronic device detecting a pair of communications by the electronic device related to a contact and parsing at least one of the pair of communications in the pair of communications to determine a time duration for a record of the contact. The method further includes the electronic device setting a time duration element for the record based on the determined time duration to cause deletion of the record when the time duration has elapsed.

Also in accordance with the teachings herein is an electronic device configured to manage contact information. The electronic device includes a receiver configured to receive communications and a transmitter configured to send communications. The electronic device further includes a processing element operatively coupled to the receiver and the transmitter that is configured to detect a pair of communications by the electronic device related to a contact. The processing element is also configured to parse at least one of the pair of communications in the pair of communications to determine a time duration for a record of the contact and set a time duration element for the record based on a result of the parsing.

In one embodiment, the time duration element is set to indicate a temporary time duration, and the processing element is further configured to delete the record upon expiration of the temporary time duration. In another embodiment, the processing element is further configured to reset the time duration element for the record from indicating an indeterminate time duration to indicating a temporary time duration based on at least one communication received in addition to the pair of communications.

For a particular embodiment, the electronic device further includes a user interface operatively coupled to the processing element. The user interface is configured to present output and accept input, and the processing element is configured to use the user interface to present a prompt for user input. The user input is then used to determine a time duration for resetting the time duration element.

Referring now to the drawings, FIG. 1 shows an electronic device 102 (also referred to herein simply as a "device") implementing embodiments in accordance with the present teachings. Specifically, the device 102 represents a smartphone that includes: a touchscreen 104, speakers 106, and a microphone 108. While two stereo speakers 106 and a single monaural microphone 108 are shown for the device 102, other devices consistent with the teachings herein may have different numbers of speakers and/or microphones including devices with no speakers and/or microphones.

Being displayed by the touchscreen 104 of the device 102 is a contact entry 110 for a contact Jacob Park. A "contact entry," as used herein, is a view of one or more records from a contacts table. Each record, also referred to herein as a "contact record," of a contact entry holds contact information for a same contact. Each record is organized into one or more fields. Different types of databases may use the terms "relation", "tuple", and "attributes" instead of view, record, and field; however, the concepts are portable between different types of database models. The contact entry 110, as displayed, shows five records, organized into five rows, with each record having two fields, organized into two columns. Data stored within fields of a contact record for a contact are used by an electronic device to communicate with other devices that are associated with the contact. More records and fields may exist in a contacts table, and different views may be shown at different times depending on the situation and implementation of data and databases accessible by the device 102.

The fields corresponding to the first column of the contact entry 110 are type fields that indicate the type of contact information being held in each record. The type fields indicate that the contact entry 110 includes records for Jacob Park's home phone number, office phone number, cell phone number, personal e-mail address, and office e-mail address. The fields corresponding to the second column of the contact entry 110 are data value fields. It is the data value fields that store the contact data, in this case Jacob Park's home phone number, office phone number, cell phone number, personal e-mail address, and office e-mail address. While a contact entry 110 for a person is shown on the touchscreen 104, the device 102 may also display contact entries for other contacts that include, but are not limited to, commercial contacts, government contacts, and automated devices.

Assuming in each of the following three examples that a phone number for a contact is held as a data value within a data value field of a record for a contacts table, a device storing the contacts table can use the phone number to initiate communication with another device that is associated with the contact. In a first example, the device 102 uses a data value stored within a data value field of a record for a contact of type: phone number to initiate communication with a florist. In a second example, the device 102 uses a data value stored within a data value field of a record for a contact of type: phone number to connect with a government poison control center. In a third example, the device 102 uses a data value stored within a data value field of a record for a contact of type: phone number to retrieve a current time and date from an automated time server.

In addition to phone numbers, other data values used to communicate with a contact can be stored within a data value field of a record for the contact. These data values include, but are not limited to, e-mail addresses, postal addresses, websites, and social networking accounts. Further, a record for a contact can include additional fields, such as property fields, that hold additional information about the record. A more detailed description of records within a contacts table is provided below with reference to FIG. 4.

While a smartphone is shown at 102, no such restriction is intended or implied as to the type of device to which these teachings may be applied. Other suitable devices include, but are not limited to: personal digital assistants (PDAs); computing devices, such as desktops, tablets, and laptops; and wearable electronic devices, such as devices worn with a wristband, clip, belt, or armband. For purposes of these teachings, a device can be any electronic apparatus that can communicate with another device and create, alter, or delete a contact record. Also, contact records may be stored on memory external to the device (e.g., accessible via a network connection), memory embedded in the device, memory removable from the device, and combinations of the above memory components.

Figure 2:
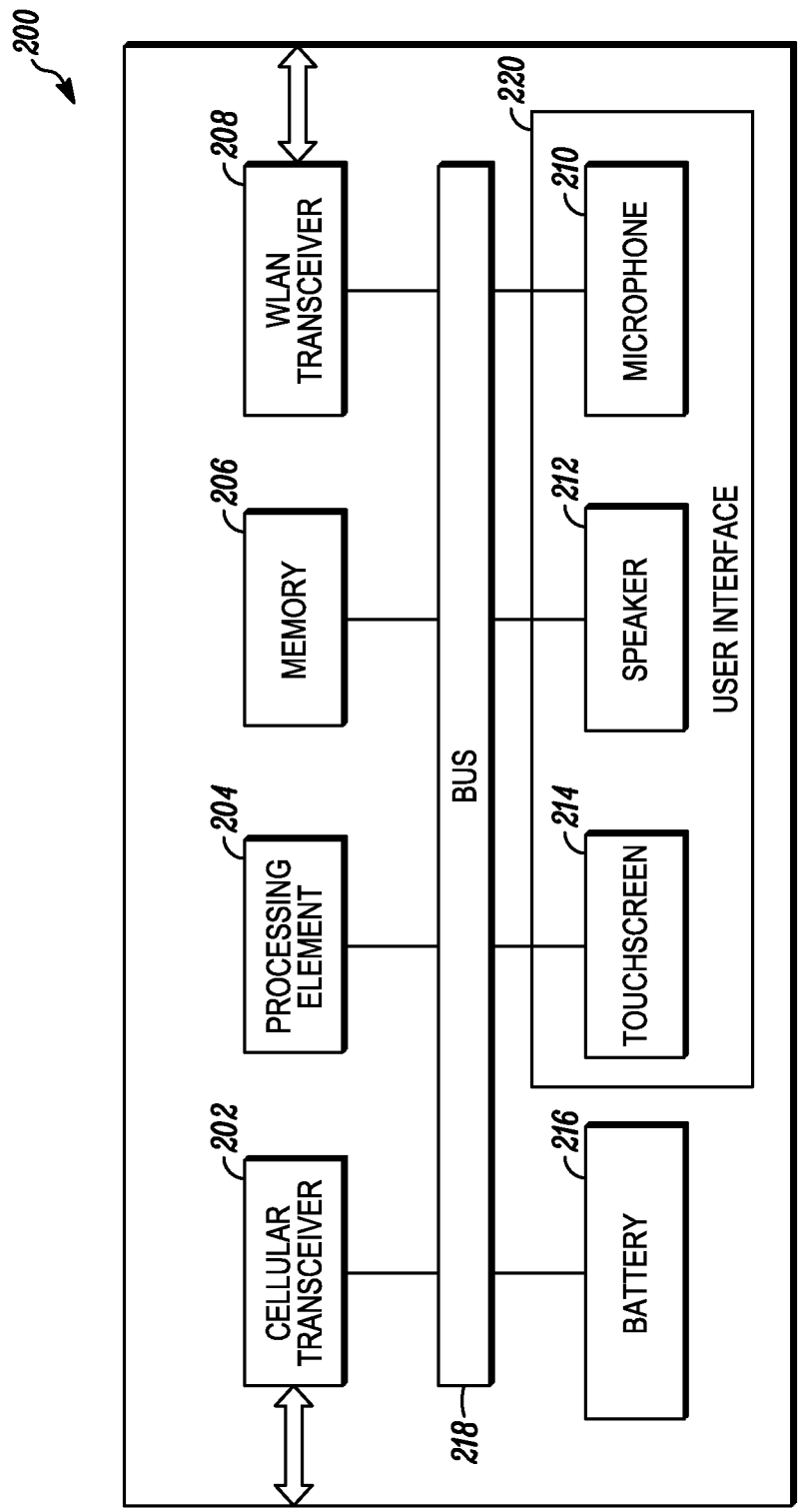
FIG. 2 is a block diagram of components of an electronic device in accordance with some embodiments of the present teachings.

FIG. 2 shows a block diagram 200 illustrating some hardware components of an electronic device in accordance with embodiments of the present teachings. For one embodiment, the block diagram 200 represents some of the components of the device 102. Specifically, the block diagram 200 shows: a cellular transceiver 202, a processing element 204, memory 206, a wireless local area network (WLAN) transceiver 208, a microphone 210, a speaker 212, a touchscreen 214, and a battery 216 which are all operatively interconnected by a bus 218.

A limited number of device components 202, 204, 206, 208, 210, 212, 214, 216, and 218 are shown at 200 for ease of illustration, and other embodiments may include a lesser or greater number of components in a device. Moreover, other components needed for a commercial embodiment of a device that incorporates the components shown at 200 are omitted from FIG. 2 for clarity in describing the enclosed embodiments.

We now turn to a brief description of the components within the block diagram 200. In general, the processing element 204 is configured with functionality in accordance with embodiments of the present disclosure as described in detail below with respect to the remaining figures. "Adapted," "operative," "capable" or "configured," as used herein, means that the indicated components are implemented using one or more hardware elements, such as one or more operatively coupled processing cores, memory elements, and interfaces, which may or may not be programmed with software and/or firmware, as the means for the indicated components to implement their desired functionality. Such functionality is supported by the other hardware shown in FIG. 2, including the device components 202, 206, 208, 210, 212, 214, 216, and 218.

The processing element 204, for instance, includes arithmetic logic and control circuitry necessary to perform the digital processing, in whole or in part, for the electronic device 102 to manage contact information in accordance with described embodiments for the present teachings. For one embodiment, the processing element 204 represents a primary microprocessor, also referred to as a central processing unit (CPU), of the electronic device 102. For example, the processing element 204 can represent an application processor of a smartphone. In another embodiment, the processing element 204 is an ancillary processor, separate from the CPU, wherein the ancillary processor is dedicated to providing the processing capability, in whole or in part, needed for the device components of the block diagram 200 to perform at least some of their intended functionality.

The memory 206 provides storage of electronic data used by the processing element 204 in performing its functionality. For example, the processing element 204 can use the memory 206 to store contact records, communications content received by or transmitted from the device, and/or cache data. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store contact records.

The block diagram 200 also shows a user interface 220. The user interface 220 is a means by which an electronic device and a user of the electronic device exchange information. It represents one or more hardware components that facilitate human-device interaction. By using the user interface 220, the device can provide output to the user. Further, for some embodiments, the user can also provide input to the device.

In one embodiment, the user interface 220 includes the touchscreen 104 of the device 102, which visually displays information and receives tactile input. The device 102 prompts the user for input, for instance, by visually displaying a set of options. The user responsively indicates his selection to the device 102 by tapping on or swiping over the option of his choice. In a different embodiment, the user interface 220 includes a display component which displays information but does not receive input.

For another embodiment, the speaker 212 and the microphone 210 represent additional or alternative user interface elements for a device. For example, the device 102 has the speakers 106 and the microphone 108 in addition to the touchscreen 104. The touchscreen 104 represents one means to exchange information with a user, while the speakers 106 and microphone 108 represent another means to exchange information with the user. The device 102 can generate a message using the speakers 106, and the user can respond by speaking into the microphone 108. The device 102 then uses voice recognition software and/or hardware to interpret the user's spoken message. In a particular embodiment where a device lacks a touchscreen, the speaker 212 and microphone 210 represent a primary (and possibly the only) means to exchange information with a user. In other embodiments, different hardware components function as the user interface 220 whereby a device and a user can interact. In a particular embodiment, a device uses a display screen to present output to a user, and the device uses a keypad or keyboard (not shown) to receive input from the user.

The cellular transceiver 202 enables the device 102 to communicate with other devices using one or more cellular networks. This includes, but is not limited to, the device 102 using a cellular network to send and receive video, voice and/or text data to and from other devices with similar capabilities for sending and receiving data. Cellular networks can use any wireless technology that, for example, enables broadband and Internet Protocol (IP) communications including, but not limited to, $3^{rd}$ Generation (3G) wireless technologies such as CDMA2000 and Universal Mobile Telecommunications System (UMTS) networks or $4^{th}$ Generation (4G) wireless networks such as LTE and WiMAX.

The WLAN transceiver 208 allows the device 102 to access the Internet using standards such as Wi-Fi. The WLAN transceiver 208 allows the device 102 to send and receive radio signals to and from similarly equipped electronic devices using a wireless distribution method, such as a spread-spectrum or orthogonal frequency-division multiplexing (OFDM) method. For some embodiments, the WLAN transceiver 208 uses an IEEE 802.11 standard to communicate with other electronic devices in the 2.4, 3.6, 5, and 60 GHz frequency bands. In a particular embodiment, the WLAN transceiver 208 uses Wi-Fi interoperability standards as specified by the Wi-Fi Alliance to communicate with other Wi-Fi certified devices. For one embodiment, a device without a cellular transceiver 202 includes a WLAN transceiver 208 used to communicate with other devices.

The battery 216 represents a power source that supplies electric power to the device components 202, 204, 206, 208, 210, 212, 214, 218, as needed, during the course of their normal operation. The power is supplied to meet the individual voltage and load requirements of the device components 202, 204, 206, 208, 210, 212, 214, 218 that draw electric current. For an embodiment, the battery 216 also powers up and powers down the device 102. For a particular embodiment, the battery 216 is a rechargeable power source. A rechargeable power source for a device is configured to be temporarily connected to another power source external to the device to restore a charge of the rechargeable power source when it is depleted or less than fully charged. In another embodiment, the battery 216 is simply replaced when it no longer holds sufficient charge.

Figure 3:
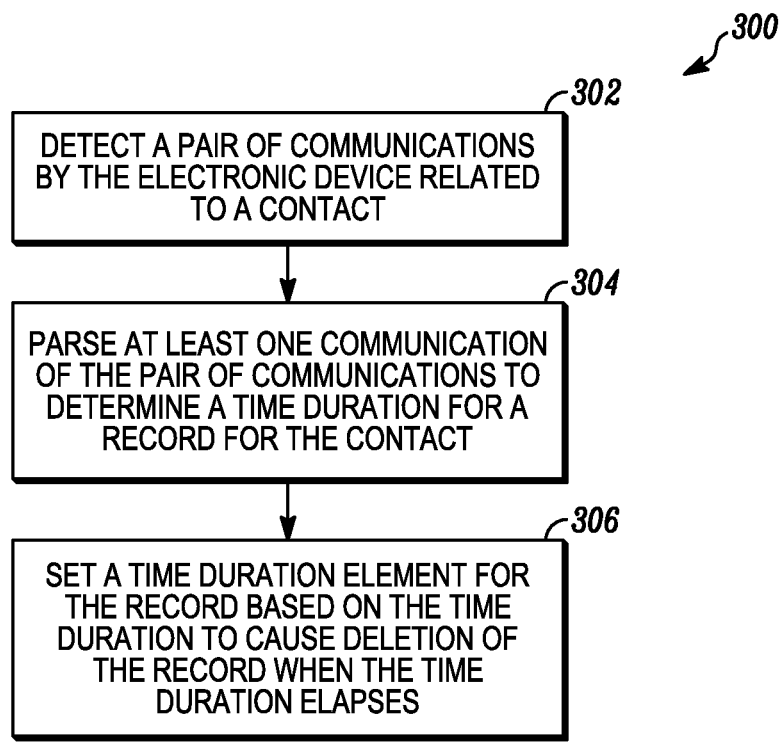
FIG. 3 is a logical flowchart depicting a method for managing contact information in accordance with some embodiments of the present teachings.

We turn now to a detailed description of the functionality of the device components shown in FIGS. 1 and 2, in accordance with the teachings herein and by reference to the remaining figures. FIG. 3 is a logical flow diagram illustrating a method 300 performed by a device, taken to be device 102 for purposes of this description, for managing contact information. Specifically, the device 102 detects 302 a pair of communications by the device 102 related to a contact. A "communication" by a device, as used herein, is a message containing informational content that is exchanged between the device and a technologically compatible device. A communication, for example, can be an e-mail sent, or a call placed, from a first device to a second device where a user of the first device wishes to communicate with a user of the second device.

A "pair of communications" represents two separate communications that are associated with or include information related to a common contact. A pair of communications can, but need not, involve the same device or even the same contact. In a first example of a pair of communications, the device 102 sends an e-mail using an email address and also receives an e-mail to that email address. This may happen in either order, where the device 102 transmits an initial e-mail and receives a response, or where the device 102 receives the initial e-mail and transmits the response. The terms "send" and transmit" are used herein interchangeably and may be either wired or wireless. In a second example of a pair of communications, the device 102 sends a text message using a phone number. The device 102 then receives a phone call from that phone number. In a third example, a contact uses another device, such as a home phone connected by a landline, to place a call back to the device 102 in response to the text message received by the second device. The device 102 identifies from preexisting contact records that the phone number to which the text message was sent and the phone number from which the call was received have the same contact-ID and thus are associated with the same contact.

In one embodiment, the device 102 detecting a pair of communications includes the device 102 identifying an incoming communication, a communication received by the device 102, and an outgoing communication, a communication sent by the device 102. In other embodiments, both communications of a pair of communications are received by the device 102, or both communications of a pair of communications are sent by the device 102. In a fourth example, the device 102 receives a first communication of a pair of communications from a first device associated with a first contact. This first communication contains contact information for the first contact. The device 102 then receives a second communication of the pair of communications from a second device associated with a second contact that confirms the contact information for the first contact.

The two communications of a pair of communications are not constrained to occur within any time interval of one another. The device 102 can, for instance, send or receive a second communication of a pair of communications minutes, days, months, or even years after a first communication of the pair of communications is sent or received. In a fifth example of a pair of communications, the device 102 receives a first communication that includes contact information. Six months later, the device 102 confirms the received contact information by using the contact information to send a second communication. The second communication can be to the same device and contact from which the first communication was received, or be to a different contact and/or device.

Continuing with this fifth example, the device 102 receives a first communication from a first contact that includes contact information for a second contact. The device 102 then uses the contact information to send a second communication to the second contact. Both communications are related to the same contact, namely the second contact. The first communication relates to the second contact because it includes contact information for the second contact as data within the communication content. The second communication relates to the second contact because it is sent to a device associated with the second contact and thus the second communication uses contact information of the second contact. The second communication also confirms the validity of the contact information for the second contact.

After detecting 302 a pair of communications related to a contact, the device 102 parses 304 at least one of the communications of the pair of communications to determine a time duration for a record for the contact. The device 102 then sets 306 a time duration element for the record based on the time duration to cause deletion of the record when the time duration elapses. A time duration element for a record, as used herein, is a data value that indicates a time duration, as measured from a current time, that is to pass before the record is marked for deletion. In one embodiment, a time duration element for a record indicates a temporary time duration, an infinite time duration, or an indeterminate time duration. A time duration indicated by a time duration element can be specified in any units of time, whether conventional (e.g., hours, days, months; a given date or date-and-time, etc.) or unconventional. For embodiments described herein, time durations are consistently indicated in days for simplicity.

A temporary time duration indicates that a record will be deleted after a finite time represented by the temporary time duration expires. If, for example, a time duration element for a record is set to indicate 14 days, the record will not be automatically deleted until at least 14 days have passed from when the time duration element was set. In one embodiment, the record is immediately deleted upon the expiration of the 14 days. In another embodiment, the record is marked for deletion upon the expiration of the 14 days. For example, the device 102 permanently deletes data marked for deletion every other day while performing routine system maintenance. On day 13, the record is not deleted because the 14-day time duration has not expired. On day 14, the record is marked for deletion but is not deleted because the device 102 only deletes data every other day. On day 15, the device 102 automatically deletes the record.

While a time duration element for a record is set to indicate an infinite time duration, the record is not deleted because the infinite time duration never comes to pass. Thus, the device 102 effectively stores the record permanently. Upon resetting the time duration element to indicate a temporary time duration, however, the record can again be deleted after the temporary time duration elapses.

The device 102 sets a time duration element for a record to indicate an indeterminate time duration if the device 102 has insufficient information from parsing communications to determine a temporary or an infinite time duration for the record. The device 102 continues to parse future communications until such time as a temporary or an infinite time duration can be set for the record.

The device 102 determines time durations by parsing communications. Parsing can be performed on communications including, but not limited to, written communications, such as e-mails and text messages, and audio communications, such as voice calls and voicemail messages. In parsing a communication, the grammatical content of the communication is identified and analyzed contextually to isolate information that can be used to determine a time duration for a record. The record may be an existing record that is already stored for a contact, or it may be a new record that will be stored for a contact.

In a first instance, a time duration is determined for a data value from a single communication of a pair of communications. For example, the device 102 determines that an e-mail received from a contact Laura Pulaski includes the text: "my number while in New York for the next six weeks will be (212) 431-3315." Upon parsing this single e-mail, the device 102 determines that there is a new phone-number for a record for the contact Laura Pulaski's and that the time duration for the phone number is 42 days from the date the e-mail was sent.

In a second instance, a time duration is determined for a record from both communications of a pair of communications. For example, Laura's first e-mail includes the text: "my number while in New York will be (212) 431-3315." A following e-mail received from Laura includes the text: "I will be in New York for the next six weeks." Upon parsing both emails, the device 102 determines that there is a new phone-number for a record for the contact Laura Pulaski's and that the time duration for the phone number is 42 days from the date the second e-mail was sent.

In a third instance, the device 102 parses communications in addition to the pair of communications to determine a time duration for a record. For example, Laura's first e-mail includes the text: "my number while in New York will be (212) 431-3315." A user of the device 102 then replies to Laura with an e-mail that includes the text: "How long will you be in New York?" A third e-mail is a response from Laura that includes the text: "for the next six weeks." Upon parsing all three emails, the device 102 determines there is a new phone number for a record for Laura Pulaski and that the time duration for the phone number is 42 days from the date the third e-mail was sent.

In each of the three previous examples, a preexisting record for Laura Pulaski stored on the device 102 is given a new data value representing Laura's phone number while she is in New York. A time duration element for the record is set to indicate a temporary time duration of 42 days, after which Laura will have left New York and the record will be marked for deletion. In another embodiment, the device 102 adds a new record for Laura Pulaski to store her New York phone number and the temporary time duration of 42 days.

Figure 4:
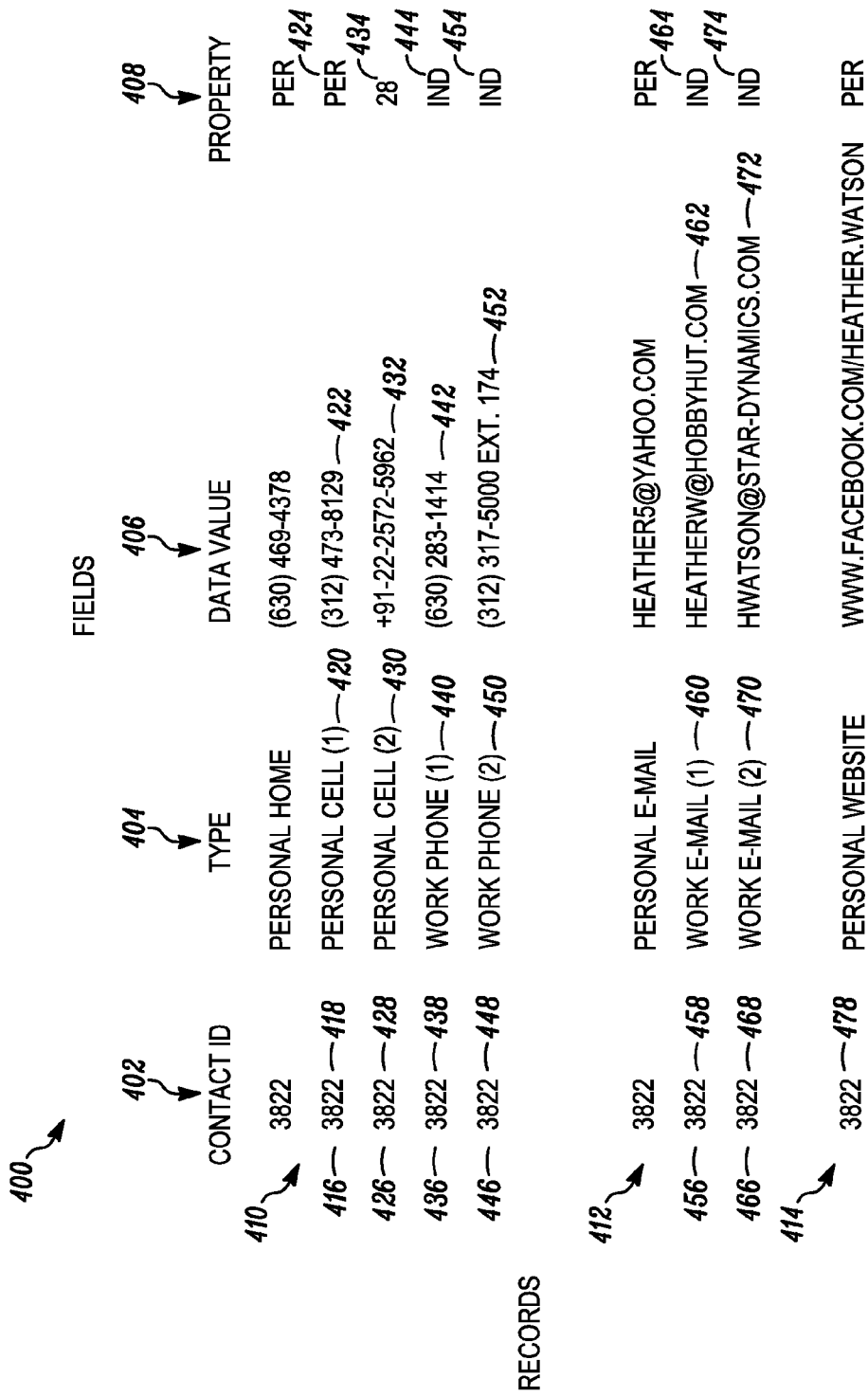
FIG. 4 is an illustration of a contact entry in accordance with some embodiments of the present teachings.

FIG. 4 shows an illustration of a contact entry 400 stored on a device consistent with an embodiment of the present teachings. The contact entry 400 is for the contact Heather Watson and includes nine records arranged in rows, which are grouped into three categories 410, 412, 414 for ease in viewing. The first category 410 includes five records for Heather's phone numbers. The second category 412 includes three records for Heather's e-mail addresses, and the third category 414 includes a single record for a uniform resource locator (URL) for Heather's website.

The contact entry 400 is also arranged into four columns 402, 404, 406, 408, with each column representing a field, such that each record includes four fields. As shown, the contact entry 400 is arranged into nine rows and four columns. For an embodiment, the contact entry 400 is a view of a larger contacts table that includes the records of other contacts and may include more records for Heather Watson or more fields than the four shown.

The first column 402 of the contact entry 400 represents contact-identification (ID) fields. The contact-ID fields, which include the fields 418, 428, 438, 448, 458, 468, and 478, store a unique number for each contact and identify records associated with the contact. The contact-ID field for each record of the contact entry 400 stores the numeric string "3822," identifying the nine records for the contact Heather Watson. Although in this example the contact-ID values are numbers, different implementations may use different values, strings, or other types of identifiers to link records that relate to the same contact.

The second column 404 of the contact entry 400 represents type fields that specify a type of record stored for the contact. For example, text stored in the type field 420 of a record 416 identifies the record 416 as being for a personal phone number, and text stored in the type field 440 of a record 436 identifies the record 436 as being for a work phone number.

The third column 406 of the contact entry 400 represents data value fields. The data value fields store the actual data used by a device to establish a connection with a contact. For example, the data value field 422 of the record 416 stores Heather's personal phone number, and the data value field 442 of the record 436 stores Heather's work phone number.

The fourth column 408 of the contact entry 400 represents property fields that specify a property of the records. For an embodiment, a property field of a record specifies a property of a data value stored within a data value field of the record. For the contact entry 400, only property fields that indicate time durations for the records are shown for explanatory purposes. In this particular embodiment, property fields 444, 454, 464, 474 with the text string "IND" indicate an indeterminate time duration. The property field 434 with the numeric string "28" indicates a temporary time duration of 28 days. Property fields with the text string "PER," such as the property field 424, indicate a permanent record with an infinite time duration. Other implementations may use different mechanisms to indicate infinite, indeterminate, and temporary time durations, such as using a blank property field to indicate a permanent record. For an embodiment, the property fields store a time and/or date. The date "2014-12-08," for example, indicates a temporary time duration ending on Dec. 08, 2014. In a further example, the time duration ends at 10:45 pm on Dec. 08, 2014 and would be indicated as such in the property field.

The record 456, for instance, has a contact-ID field 458 with a numeric string "3822" that indicates the record 456 is for the contact Heather Watson. The record 456 also has a type field 460 that indicates the data value stored in the data value field 462 is a work e-mail address for Heather Watson.

Other working embodiments can have contact records with fields in addition to those shown for the contact entry 400 specifying additional types and/or properties of data values. For example, additional fields can specify names, notes, birthdays, or contact nicknames. Additional fields are excluded from the contact entry 400 to avoid unnecessary complication.

When the device 102 determines a new data value for a contact from parsing communications, records for the contact indentified by a unique contact-ID number may or may not exist. If contact records exist for a contact, then the device 102 updates the contact records. Updating contact records for a contact includes adding a new record for the contact and/or modifying an existing record for the contact.

For a particular embodiment, the device 102 receives a communication that indicates an update to existing contact records for a contact. The device 102 then transmits a confirmation communication from the user. The received communication and the confirmation communication together represent a pair of communications that are parsed to determine a new data value for the contact. The device 102 then creates a new record for the contact for the new data value.

In a further embodiment, the device 102 uses the new data value to transmit the confirmation communication. For example, the device 102 receives a communication from a contact Bob Smith which the device 102 parses to determine a new phone number for a contact Steve Hadley. At some point in time after receiving the communication from Bob, the device 102 calls the new phone number. If the device 102 is successful in reaching a device belonging to Steve, then the phone number is confirmed and the device 102 updates its contact records for Steve Hadley with the new phone number.

Continuing with this embodiment, the device 102 updates the contact record for Steve Hadley's new phone number to include a time duration element that indicates a temporary time duration for Steve's new phone number. In parsing the communication received from Bob, for example, the device 102 determines that Steve's new number is only valid until Dec. 08, 2014.

In an alternate embodiment, the device 102 parses a communication received from Steve, rather than from Bob, to determine Steve's new phone number. Upon the device 102 using the new phone number to reach Steve at a future time, the device 102 updates its contact record for Steve Hadley. For this embodiment, the communication received from Steve and the communication sent to Steve represent a pair of communications that are detected and parsed by the device 102 prior to updating Steve's contact record.

For some embodiments, the device 102 is unable to determine a time duration for a property field of a contact record from parsing a pair of communications related to a contact. It may be the case, for example, that a pair of communications indicates a new data value for the contact but that neither communication includes information that allows the device 102 to determine a time duration for the new data value. In this case, the device 102 sets a time duration element for a property field of a record that stores the new data value to indicate an indeterminate time duration until additional communications can be parsed to determine either a temporary or an indefinite time duration for the record.

In a particular embodiment, the device 102 updates contact records for a contact to include a new record determined from parsing a pair of communications, wherein a first time duration element is set to indicate an indeterminate time duration for the new record. The device 102 also resets a second time duration element for an existing record to indicate an indeterminate time duration. The device 102 then detects and parses at least one additional communication to determine a time duration for the new record. Upon determining the time duration is an infinite time duration, the device 102 resets the first time duration element for the new record to indicate the infinite time duration and resets the second time duration element for the existing record to cause deletion of the existing record. Alternatively, upon determining the time duration is a temporary time duration, the device 102 resets the first time duration element for the new record to indicate the temporary time duration and resets the second time duration element for the existing record to indicate an infinite time duration.

Figure 5:
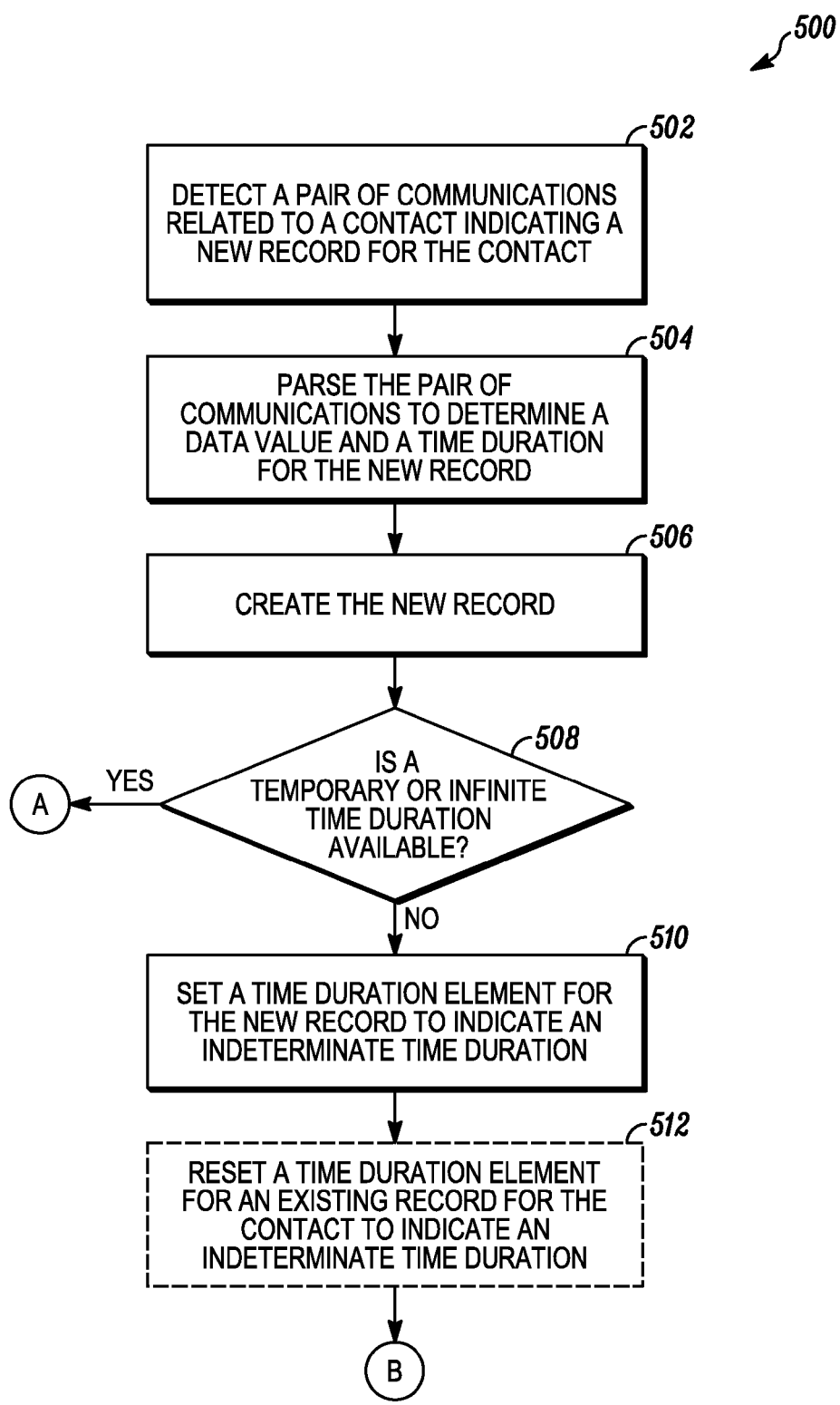
FIG. 5 is a logical flowchart depicting a method for managing contact information in accordance with some embodiments of the present teachings.
Figure 6:
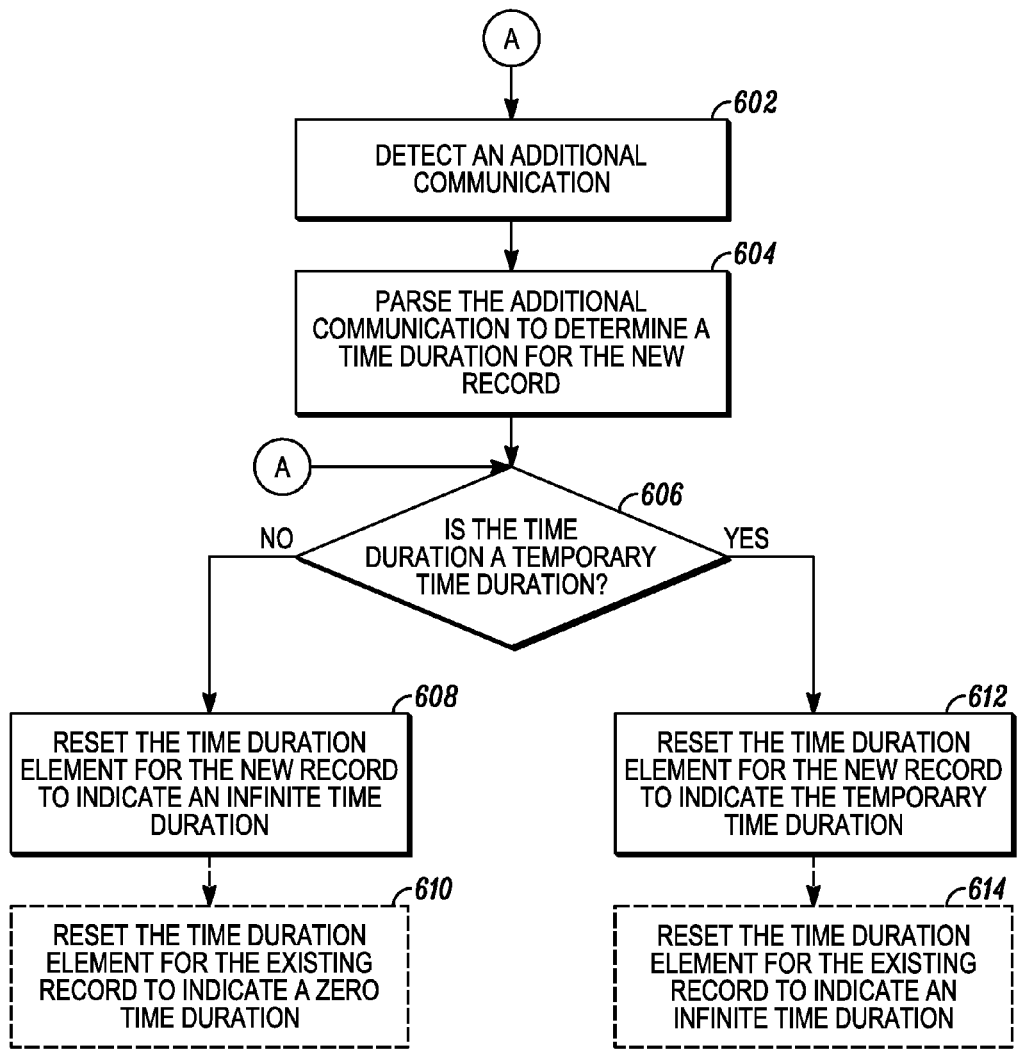
FIG. 6 is a logical flowchart depicting a method for managing contact information in accordance with some embodiments of the present teachings.

The flowchart shown in FIGS. 5 and 6 illustrates a method 500 consistent with this embodiment. More specifically, the flowchart shows the device 102 detecting 502 a first pair of communications related to a contact indicating a new record for the contact. The device 102 parses 504 the pair of communications to determine a data value for the new record and a time duration for the new record. The device 102 creates 506 the new record for the contact, stores the data value within a data value field of the record, and determines 508 if a temporary or infinite time duration is available for the new record from parsing the pair of communications. If a temporary or infinite time duration is not available, the device 102 sets 510 a time duration element for the new record to indicate an indeterminate time duration. Generally, for some embodiments, the device 102 resets time duration elements for records from indicating an indeterminate time duration to indicating infinite or temporary time durations when the device 102 can determine infinite or temporary time durations for the records from parsing additional communications.

As an optional action in the method 500, the device 102 also resets 512 a time duration element for an existing record for the contact to indicate an indeterminate time duration. The device 102 might take this action if the new record represents a same data type as the existing record. For example, if the device 102 determines a new cell number data value for the contact but is unable to determine a time duration for the new cell number, the device 102 might be uncertain as to whether the new cell number is intended to replace an existing cell number for the contact or if the new cell number is intended as an additional or an alternative cell number for the contact.

Transitioning to FIG. 6, the method 500 continues with the device 102 detecting 602 an additional communication, to the pair of communications, that indicates the time duration for the new record and parsing 604 the additional communication to determine the time duration. If the device 102 determines 606 that the time duration is a temporary time duration, then the device 102 resets 612 the time duration element for the new record to indicate the temporary time duration. If the device 102 also took the optional action of resetting 512 a time duration element for an existing record for the contact to indicate an indeterminate time duration, then the device 102 additionally resets 614 the time duration element for the existing record to indicate an infinite time duration. This is because the new record is temporary and not intended as a replacement for the existing record.

Turning momentarily to the next drawing, FIG. 7 shows an e-mail 700 sent by contact Heather Watson to Abhishek Patel, presumed to be the owner of the device 102 for this embodiment. Upon receiving the e-mail 700, the device 102 parses it and detects a data value 702 for inserting into a new data value field 432 for a new contact record 426 for the contact Heather Watson. Because contact records for Heather Watson already exists, any previous communication between the device 102 and Heather, together with the e-mail 700, can constitute a pair of communications. The data value 702 is Heather's phone number while she is visiting India. While parsing the e-mail 700, the device 102 also detects a time duration 704 of four weeks for her phone number. To the contacts table stored for the device 102, the device 102 adds the record 426 with Heather Watson's contact-ID number. The device 102 stores Heather's phone number 702 in the data value field 432 and sets the data property field 434 for the phone number 702 to indicate the time duration 704 of 28 days. An associated type field 430 indicates that the phone number 702 is a second personal cell number, because a record 416 for a first personal cell number already exists. Further, the property field 424 for the first personal cell number retains the text string "PER," indicating that the time duration element for the first personal cell number remains infinite despite the second personal cell number 702 being added to Heather's contact records.

In an alternate embodiment, the e-mail 700 includes Heather's new phone number 702 but does not include a time duration for the phone number 702. In this case, the device 102 sets the time duration elements for the property fields 424 and 434 to indicate an indeterminate time duration. Upon parsing an additional e-mail received from Heather to determine that her new phone number 702 is a temporary phone number, the device 102 resets the time duration element for the property field 424 to again indicate an infinite time duration and resets the property field 434 to indicate the temporary time duration.

Returning to FIG. 6, if the device 102 determines 606 that the time duration for the new record is an infinite time duration, indicating that the new record is permanent, then the device 102 resets 608 the time duration element for the new field to indicate the infinite time duration. Optionally, the device 102 also resets 610 the time duration element for the existing record to indicate a zero time duration. This is because the new record is intended as a replacement for the existing record. The zero time duration indicates the existing field is marked for deletion, in which case the existing field is either deleted immediately or when the device 102 next performs an automatic deletion of data marked for deletion.

If the device 102 determines 508 that a time duration is available upon parsing 504 the pair of communications for the new record, then the device 102 proceeds to set the time duration element for the new record after determining 606 if the time duration is temporary or infinite. If the time duration is temporary, the device 102 sets 612 the time duration element for the new record to indicate the temporary time duration. If the time duration is infinite, the device 102 sets 608 the time duration element for the new record to indicate the infinite time duration.

Turning to FIG. 8, Heather Watson sends an e-mail 800 to Abhishek Patel, who is still the presumed owner of the device 102. For an embodiment, the e-mail 800 and any previous communication exchanged between Heather and the device 102 constitute a pair of communications. Upon receiving the e-mail 800, the device 102 parses it and tries to detect an indication of a data value for a data value field and an associated time duration. In parsing the e-mail 800, the device 102 detects two data values 802, 804 that indicate two new records to add to a contacts table for the device 102 for the contact Heather Watson. The data value 802 represents Heather's new work number, and the data value 804 represents Heather's new work e-mail address. The e-mail 800 also provides an indication that Heather has left her old job and that her new work number 802 and e-mail address 804 are permanent rather than temporary. The device 102, however, has not yet confirmed Heather's new work number 802 and e-mail address 804.

To the contacts table for the device 102, the device 102 adds the records 446 and 466 for Heather's new work number data value 802 and e-mail address data value 804, respectively. In the data value field 452 of the record 446, the device 102 stores the new work number 802. The device 102 sets the contact-ID field 448 to the numeric string "3822," indicating the record 446 is for the contact Heather Watson, and sets the type field 450 to indicate that the record 446 holds a second work number for Heather. In the data value field 472 of the record 466, the device 102 stores the new work e-mail address data value 804. The device 102 saves the numeric string "3822" to the contact-ID field 468 and sets the type field 470 to indicate a second work e-mail address.

The device 102 does not yet delete the records 436 and 456 for Heather's old work phone number and old work e-mail address, respectively, from the contacts table for the device 102. Instead, the device 102 sets the property fields 454 and 474, for Heather's new work number and e-mail address, and resets the property fields 444 and 464, for Heather's old work number and e-mail address, to the text string "IND," indicating an indeterminate time duration. Upon confirming Heather's new work number 802 and e-mail address 804 by successfully connecting with Heather at work using her new work number 802 and e-mail address 804, the device 102 resets the property fields 454 and 474 to the text string "PER," indicating an infinite time duration, and resets the property fields 444 and 464 to "0," indicating deletion.

In an alternate embodiment, the device 102 is unable to determine a time duration for the new work number data value 802 or e-mail address data value 804 from parsing the e-mail 800 or a communication sent to Heather in reply to the e-mail 800. As before, the device 102 sets the data property fields 454, 474 and resets the data property fields 444, 464 to the text string "IND" to indicate an indeterminate time duration. Upon detecting and parsing additional communications to determine that the new work number 802 and e-mail address 804 are permanent rather than temporary, the device 102 resets the property fields 454 and 474 to the text string "PER," indicating an infinite time duration, and resets the property fields 444 and 464 to "0," signaling deletion.

For some embodiments consistent with the teachings herein, the device 102 determines a data value for a new record for a contact for which contact records do not exist in a contacts table for the device 102. This includes embodiments for which the device 102 detects solicitation communications. The device 102 can transmit or receive an initial solicitation communication to or from a contact for which there is no contact record accessible to the device 102, either stored on the device 102, or stored on another device if that is a means by which the device 102 accesses contact information. As an example, a user of the device 102 is searching for portrait photographers and uses a web browser form to request two candidate photographers. In one instance, the device 102 receives a solicitation e-mail from a contact for which the device 102 does not have a contact record. The user then uses the device 102 to transmit a response communication, such as an e-mail or telephone call, to the solicitation communication. The solicitation communication and the response communication form a pair of communications that the device 102 parses to determine a contact record for the contact.

Determining a contact record as used in the situation where a record for a contact does not already exist, means to create a new contact-ID number or identify an existing contact-ID number and additionally to create at least one record with that contact-ID number and store that record for the contact in memory. The record with that contact-ID number may be stored on the device 102 or stored on another device accessible to the device 102. Determining a contact record as used in the situation where a record for a contact already exists, means to create an additional record for the contact with the contact-ID number for the contact, or to modify the existing record.

Completely deleting or removing the contact records for a contact means deleting or removing all records having a particular contact-ID number. For an embodiment, if a contacts table has only one record for a contact with a particular contact-ID number, then removing that record completely removes the contact records for the contact from the contacts table. Similarly, if there are multiple records for a contact in the contacts table, then completely removing the records for the contact means removing the multiple records for the contact. For another embodiment, the device 102 can set a time duration element for a contact by setting a time duration element of every record with the particular contact-ID number, whether it be a single record or multiple records, to the same time duration. When the time duration expires, the records for the contact are completely removed by deleting each of the records having that contact-ID number. In an example, the device 102 sets a time duration element for a contact to a time duration of 14 days by setting a time duration element for every record in a contacts table having a particular contact-ID number to the time duration of 14 days. When the 14-day time duration expires, the device 102 completely deletes the contact records for the contact by removing every record with that particular contact-ID number.

Figure 9:
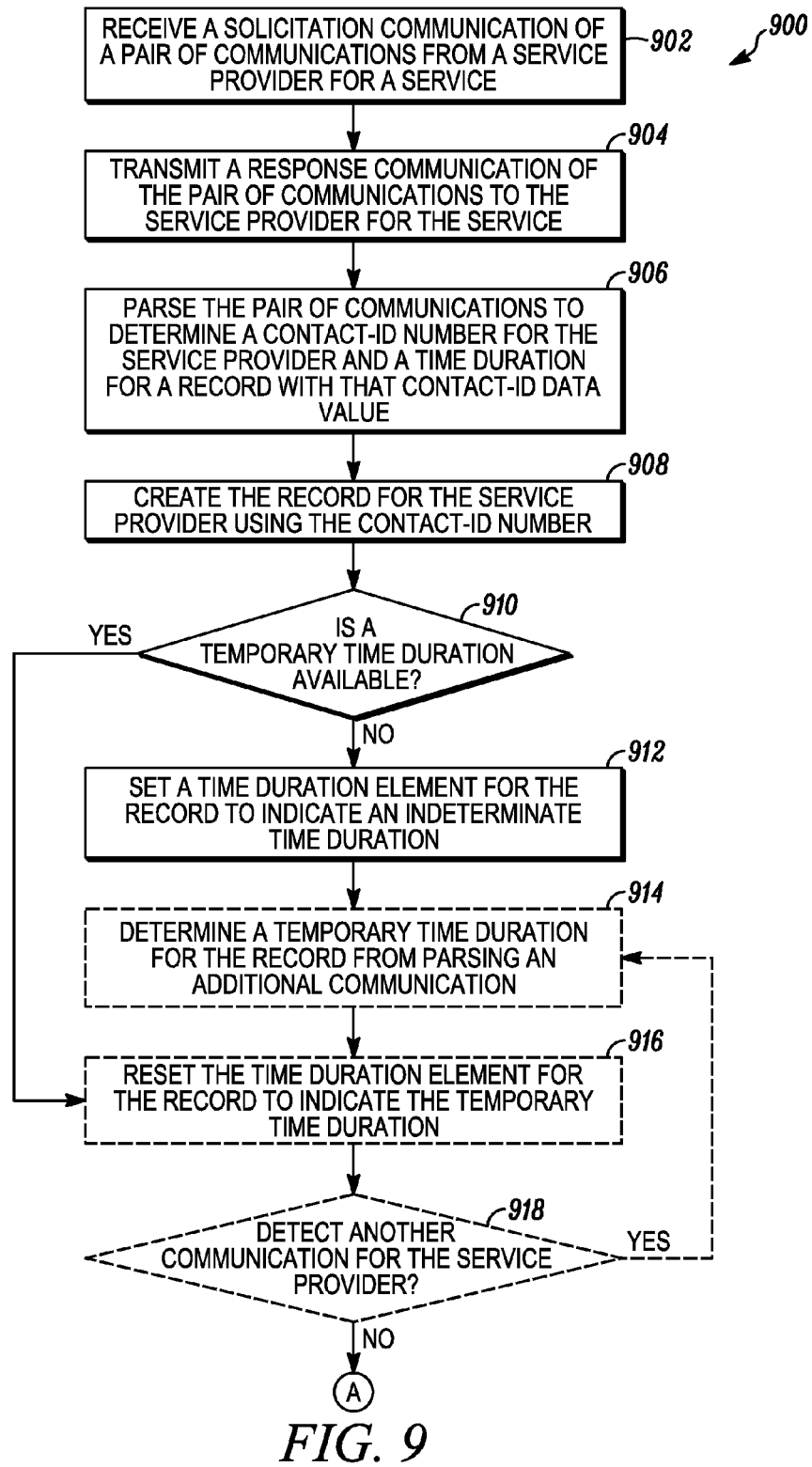
FIG. 9 is a logical flowchart depicting a method for managing contact information in accordance with some embodiments of the present teachings.
Figure 10:
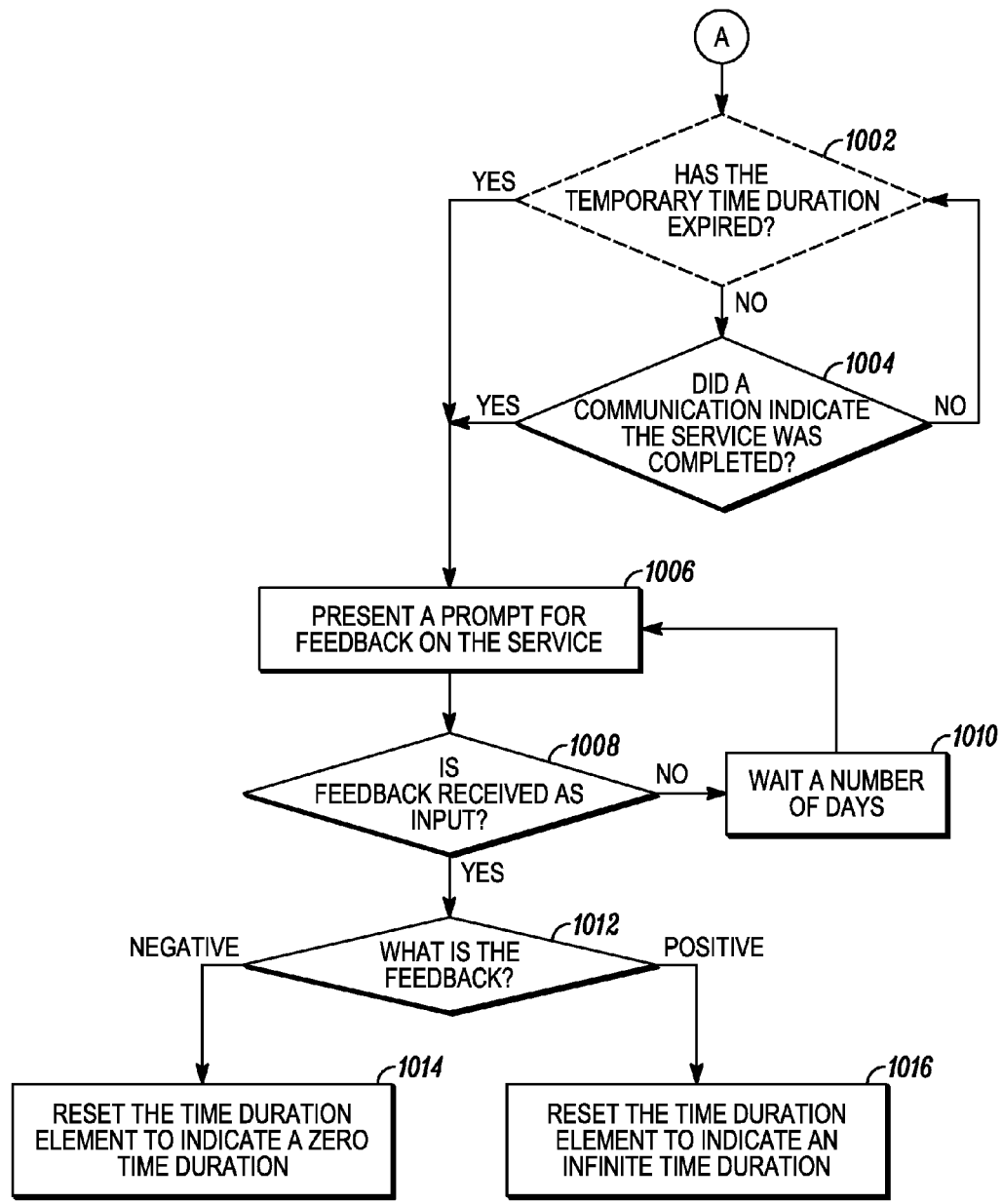
FIG. 10 is a logical flowchart depicting a method for managing contact information in accordance with some embodiments of the present teachings.

FIGS. 9 and 10 show a logical flowchart illustrating a method 900 of managing contact information related to an incoming solicitation communication. In particular, the method 900 includes the device 102 receiving 902 a solicitation communication from a service provider for a service and transmitting 904 a response communication to the service provider for the service. The solicitation and response communications form a pair of communications related to the service provider. The device 102 parses 906 the pair of communications to determine a contact-ID number for the service provider and a time duration for a record created 908 with that contact-ID number.

For one embodiment, parsing the pair of communications includes parsing at least one of the solicitation communication or the response communication to determine a type of service offered by the service provider. The device 102 then determines the time duration based on the type of service and creates a contact record for the service provider, wherein the time duration is based on the type of service.

For example, the device 102 receives a solicitation communication that includes an offer for paving a driveway in a state of disrepair. A homeowner then uses the device 102 to reply to the solicitation communication and accept the offer. In parsing the pair of communications, the device 102 determines a start date for the service but fails to determine a length of time for the service, which is the amount of time it takes to complete the service after the service has begun. The device 102 then accesses a database that specifies lengths of time for different services and determines a length of time for residential driveway paving. This length of time is added to the start date for the service to determine a time duration for the contact record with the service provider's contact-ID data value. The time duration is then stored in a property field of the contact record for the service provider.

If, after parsing 906 the pair of communications, the device 102 determines 910 a temporary time duration is available from the communication content, the device 102 sets 916 the time duration element for the record for the service provider to indicate the temporary time duration. If the device 102 fails to determine 910 a temporary time duration for the service from either parsing 906 the pair of communications or based on the type of service, then the device 102 sets 912 a time duration element for the record for the service provider to indicate an indeterminate time duration. In optional actions, the device 102 detects and parses an additional communication related to the service to determine 914 a temporary time duration for the service. When the device 102 determines a time duration for the service, it resets 916 the time duration element for the record for the service provider from indicating an indeterminate time duration to indicating the temporary time duration.

The additional communication can be between the device 102 and any device associated with a contact record of a contacts table for the device 102. For example, the device 102 receives a communication from the paving company indicating that the paving will be completed by the end of the week. The additional communication can also be between the device 102 and a device associated with a record of the contacts table that is not for to the service provider. For example, the homeowner uses the device 102 to contact guests via an e-mail in which the homeowner explicitly indicates she is postponing a dinner party until after an upcoming weekend because the paving of her driveway will not be completed until the end of the week. The device 102 parses the text of the e-mail to determine a temporary time duration for the contact record for the service provider that expires at the end of the week.

For one embodiment, the device 102 detects 918 and parses another communication, sent or received after the additional communication, to determine 914 a second temporary time duration for the contact record for the service provider. The device 102 then resets 916 the time duration element for the contact record from indicating the first temporary time duration that causes the device 102 to delete the contact record on a first date to indicating the second temporary time duration that causes the device 102 to delete the contact record on a second date that is different from the first date. In a further embodiment, the actions of detecting 918 and parsing additional communications to determine 914 a new temporary time duration and then resetting 916 the time duration element for the contact record may repeat any number of times.

For instance, on Monday, the device 102 receives a communication from the paving company indicating that the paving will be completed on Friday. The device 102 resets the time duration element from indicting an indeterminate time duration to a first temporary time duration of four days. The device 102 then receives another communication from the paving company on Thursday indicating that because of a forecast for rain, the paving will not be completed until Wednesday of the following week. After parsing the additional communication to determine the second temporary time duration of six days, the device 102 resets the time duration element to indicate the remaining six days.

Continuing the description of the method 900 with reference to FIG. 10, the device 102 may monitor the passage of time to determine 1002 if the temporary time duration for the service has expired. For example, the time duration element for the service was set on Monday to indicate a time duration of four days and it is currently Friday of the same week. The device 102 also monitors and parses additional communications to determine 1004 if the service was completed. For example, the device 102 receives a "thank you" or "satisfaction survey" communication from the paving company confirming that the service was completed and that payment was received.

For one embodiment, when the temporary time duration expires, or when the device 102 determines that the service was completed, the device 102 prompts 1006 a user for feedback on the service. The device 102 then determines 1008 if feedback is received in response to the prompt. If the device 102 does not receive feedback, then it waits 1010 a predetermined number of days and again prompts 1006 the user for feedback. If the device 102 does receive feedback, then it determines 1012 if the feedback is positive or negative. If the device 102 receives positive feedback on the service, meaning that the homeowner holds a favorable opinion about the service provider, then the device 102 resets 1016 the time duration element for the contact record for the service provider to indicate an infinite time duration. If, on the other hand, the device 102 determines 1012 that the feedback is negative, then the device 102 resets 1014 the time duration element for the contact record for the service provider to indicate a zero time duration, whereby the contact record for the service provider is marked for deletion.

After determining that the paving is completed, the device 102, for example, presents the homeowner with one or more questions about the service.

The device 102 receives responses using the user interface 220. There can be a question as simple as "Based on your experience with this service provider, would you like to keep its contact information?" Alternatively the prompting and the feedback can be more complicated. For example, based on the homeowner's responses to a series of customer satisfaction questions, the device 102 assigns a score to the service provider. If the score exceeds a threshold score, then the device 102 sets an infinite time duration for the contact record for the service provider so the homeowner can more easily contact the service provider again when needed.

Figure 11:
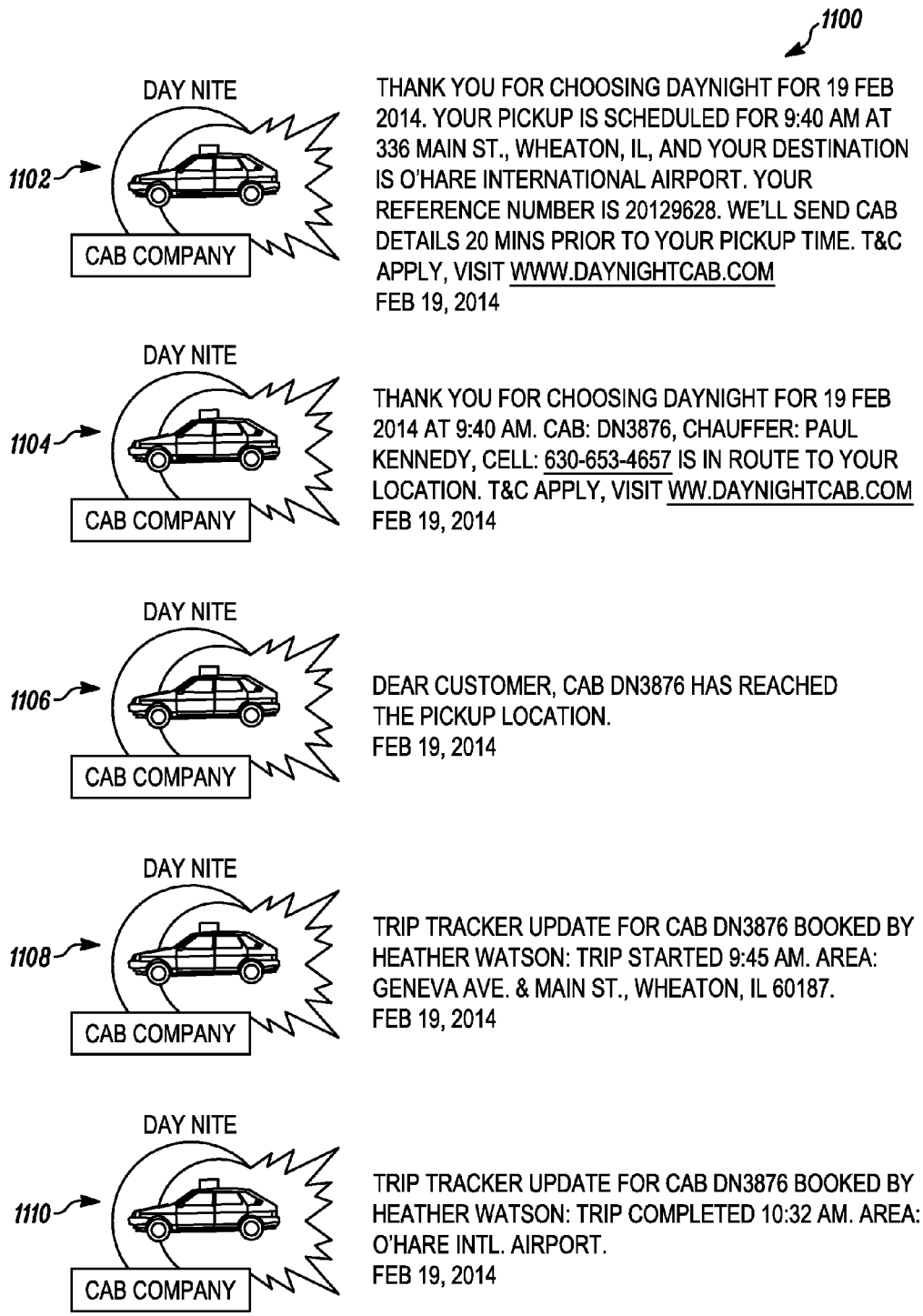
FIG. 11 is an illustration of a series of text messages with time-duration information for a record for a contact in accordance with some embodiments of the present teachings.

FIG. 11 shows a series of text messages 1100 that include time-duration information for a contact record that is to be created on the device 102, which is presumed for the immediate example to be for Heather Watson. In particular, FIG. 11 shows the series of text messages 1100 the device 102 receives from a cab company on a day that Heather is leaving for India.

Heather contacts a cab company for a ride to the airport and receives a first text message 1102 from the cab company indicating that a cab will arrive at her residence at 9:40 am. A second text message 1104 from the cab company provides the name of the chauffer who will be driving Heather to the airport along with his cell number. The device 102 parses the text messages 1102 and 1104 and creates a contact record for the cab company that includes the chauffer's cell number in a data value field of the contact record. The contact record allows Heather to more easily contact the chauffer should she need to. It also allows a caller identification function on the device 102 to identify the chauffer, whose number Heather might not otherwise recognize, should he call before arriving at Heather's residence. Another record for the cab company might also include a phone number of the cab company. For one embodiment, the text messages 1102 and 1104 represent a pair of communications related to the cab company. For another embodiment, an initial outgoing communication (not shown) from the device 102 to the cab company and the text message 1102 represent a pair of communications related to the cab company.

For an additional embodiment, the device 102 determines from parsing a previous itinerary communication received from a travel agency that, in addition to having DayNight Cab Company reserved for Feb. 19, 2014, Heather's flight departs at 1:00 pm on Feb. 19, 2014. For example, a communication the device 102 received from the travel agency includes a detailed flight itinerary. The device 102 uses this information to set the temporary time duration for the cab company's contact record to expire on Feb. 19, 2014 at 1:00 pm. The device 102 then detects an additional communication 1110 received from the cab company at 10:32 am and determines from the additional communication 1110 that the cab company's service is completed. The device 102 resets, in response to determining that the service is completed, the time duration element for the contact record for the cab company from indicating the first temporary time duration that causes the device 102 to delete the contact record at 1:00 pm to a second temporary time duration that indicates deletion of the contact record at 10:32 am.

For one embodiment, the expiration of a time duration indicated by a time duration element causes the deletion of a single record for a contact. For example, at 1:00 pm, the device 102 deletes the record that holds the chauffer's cell number. For another embodiment, the expiration of a time duration indicated by a time duration element causes the deletion of multiple records for a contact. For example, at 1:00 pm, the device 102 deletes both the record that holds the chauffer's cell number and a record that holds the phone number of the cab company. For a further embodiment, the expiration of a time duration indicated by a time duration element causes the deletion of all records for a contact.

Text messages 1106, 1108, and 1110 detail the progress of Heather's cab ride to the airport as a courtesy "trip tracking" service provided by the cab company. When the device 102 receives and parses the text message 1110, it determines that the chauffer dropped Heather off at the airport at 10:32 am. The device 102 then resets the time duration element for the cab company's contact record for immediate deletion. For another embodiment, the device 102 does not reset the time duration element based on the cab ride being completed. This allows Heather to more easily contact the cab company in the event her flight is delayed or cancelled.

Figure 12A:
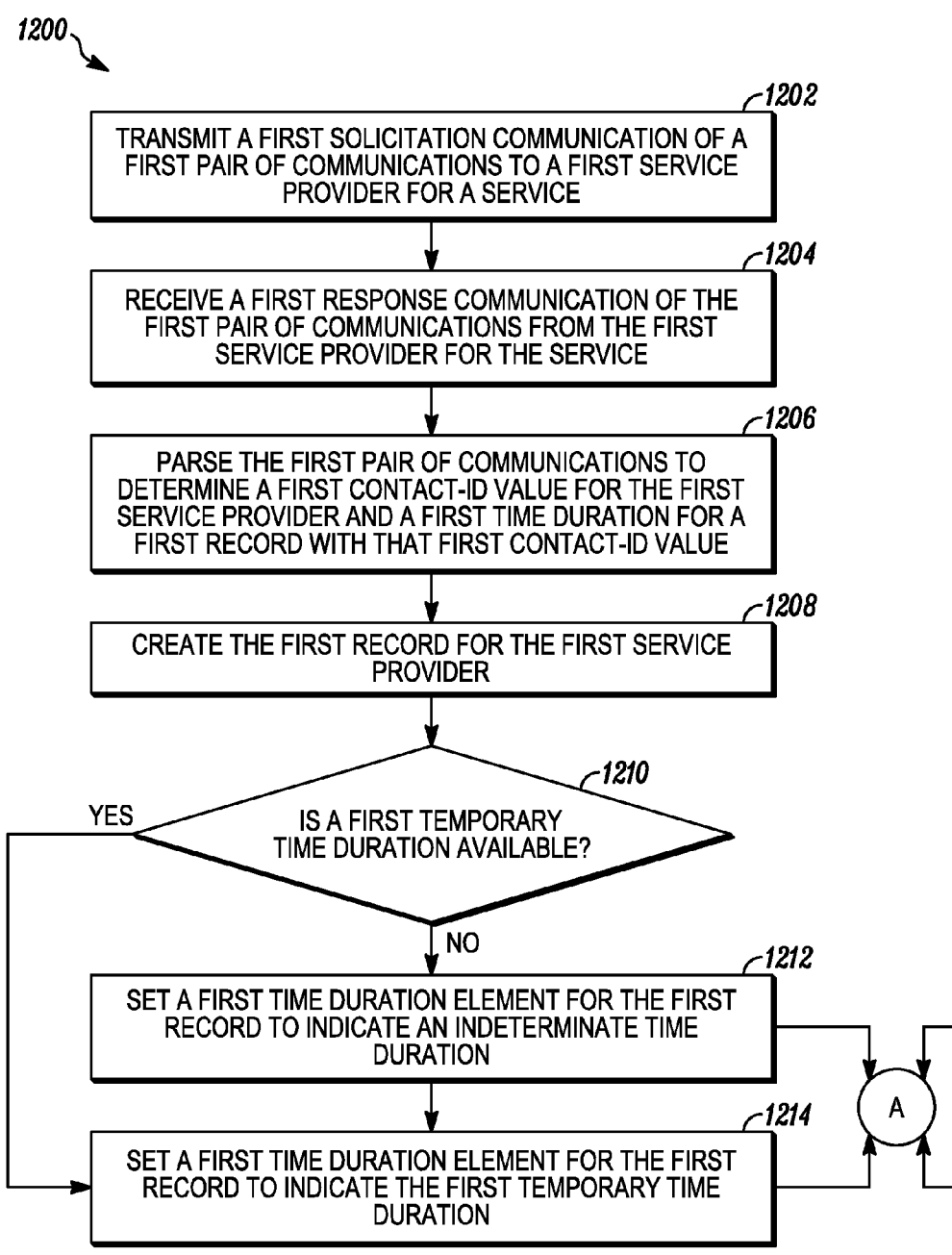
FIGS. 12A and 12B are a logical flowchart depicting a method for managing contact information in accordance with some embodiments of the present teachings.
Figure 12B:
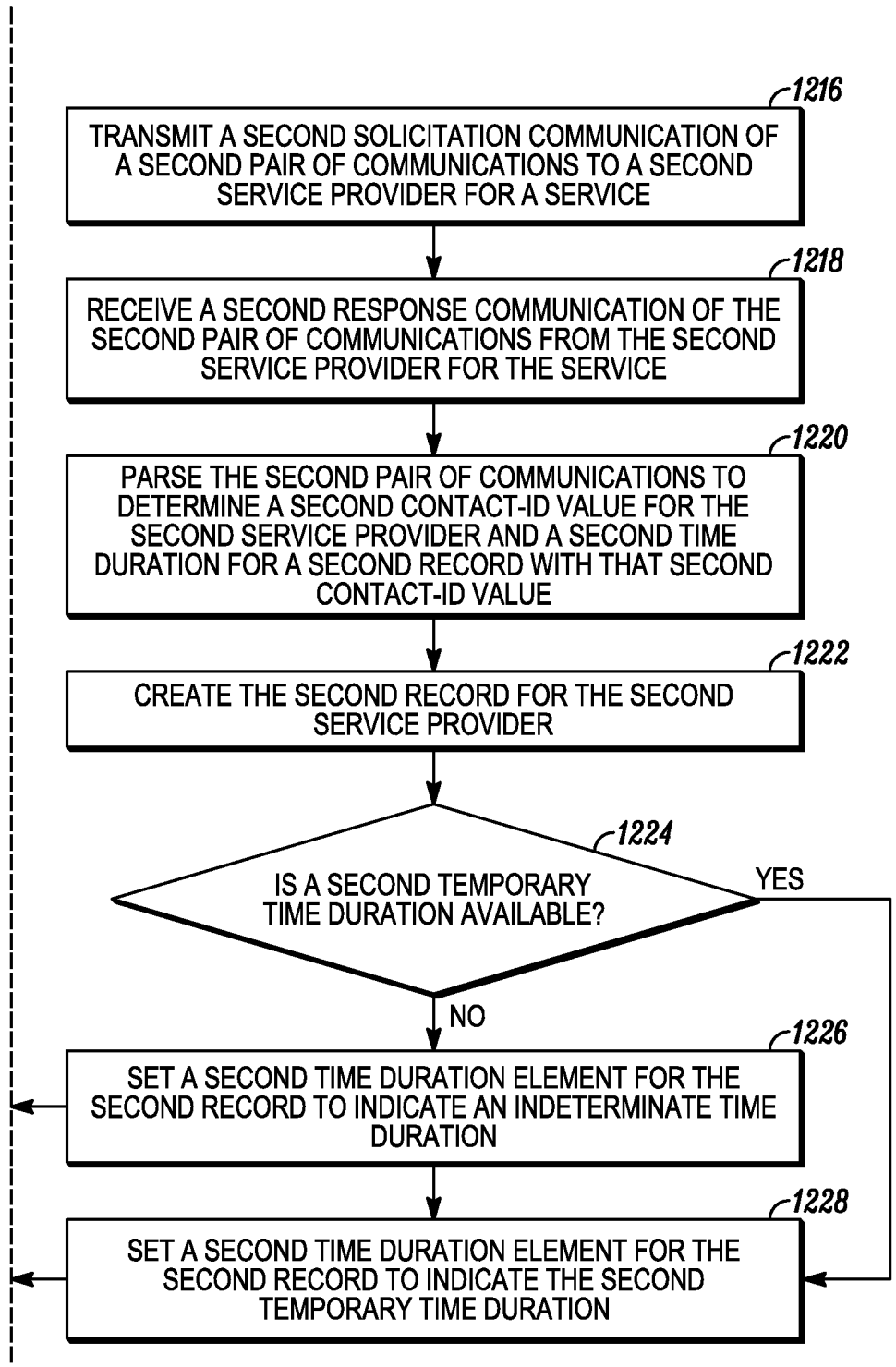
Figure 13:
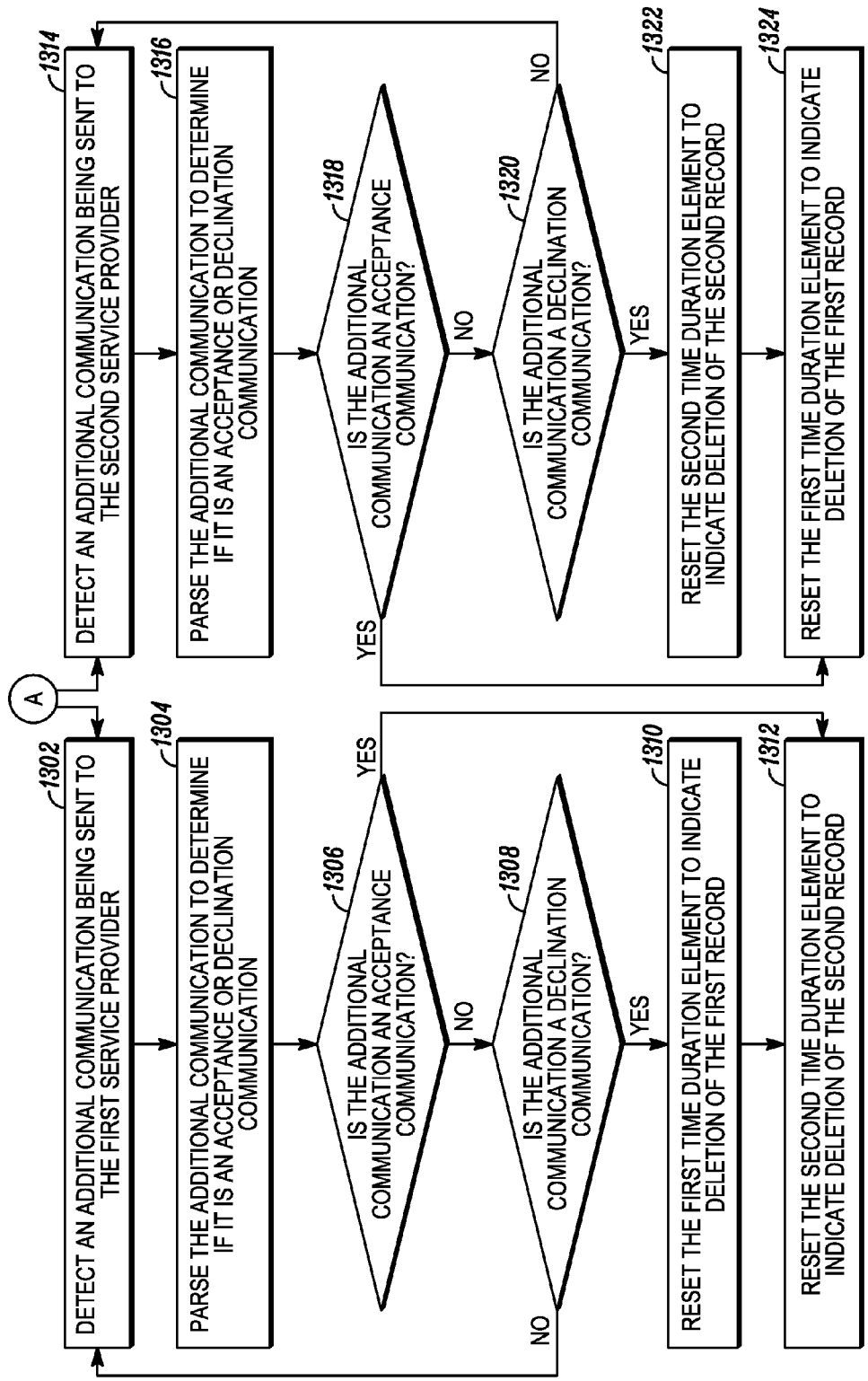
FIG. 13 is a logical flowchart depicting a method for managing contact information in accordance with some embodiments of the present teachings.

FIGS. 12A, 12B, and 13 show a logical flowchart illustrating a method 1200 of managing contact information related to outgoing solicitation communications. For an outgoing solicitation, the device 102 transmits an initial solicitation communication to a contact, receives a response communication to the solicitation communication, and creates a contact record for the contact. The solicitation communication and the response communication form the pair of communications. For a particular embodiment, the device 102 sets a time duration element for the record to indicate an indeterminate time duration. For example, the user of a device 102 is evaluating competing service providers for a particular service. Based on the evaluation results, the user may select one of the service providers or none of the service providers.

In particular, the method 1200 includes the device 102 transmitting 1202 a first solicitation communication of a first pair of communications to a first service provider for a service and receiving 1204 a first response communication of the first pair of communications from the first service provider for the service. The device 102 parses 1206 the first pair of communications to determine a first contact-ID number for the first service provider and a first time duration for a first record for the first service provider with that contact-ID number. The device 102 then creates 1208 the first contact record. If the device 102 determines 1210 from parsing 1206 the first pair of communications that a first temporary time duration is available for the first record for the first service provider, then the device 102 sets 1214 a first time duration element for the first record to indicate the first temporary time duration. If the device 102 determines 1210 a first temporary time duration is unavailable, then the device 102 sets 1212 the first time duration element for the first record to indicate an indeterminate time duration.

The method 1200 also includes the device 102 transmitting 1216 a second solicitation communication of a second pair of communications to a second service provider for the service and receiving 1218 a second response communication of the second pair of communications from the second service provider for the service. The device 102 parses 1220 the second pair of communications to determine a second contact-ID number for the second service provider and a second time duration for a second record for the second service provider with that second contact-ID number. The device 102 then creates 1222 the second contact record. If the device 102 determines 1224 from parsing 1220 the second pair of communications that a second temporary time duration is available for the record for the second service provider, then the device 102 sets 1228 a second time duration element for the second record to indicate the second temporary time duration. If the device 102 determines 1224 a second temporary time duration is unavailable, then the device 102 sets 1226 the second time duration element for the second record to indicate an indeterminate time duration.

Although shown as occurring in parallel, communications with the first service provider and the second service provider may occur sequentially, in parallel, partially in parallel, or with no particular timing relationship among the communications. Also, additional solicitation communications may be sent to additional service providers that may result in the creation of more contact records.

Continuing the description of the method 1200 with reference to FIG. 13, the method 1200 includes the device 102 performing one or more of the following four actions. For the first action, the device 102 detects 1306 an acceptance communication between the device 102 and the first contact, and responsively resets 1312 the second time duration element to indicate deletion of the second contact record. For the second action, the device 102 detects 1308 a declination communication between the device 102 and the first contact, and responsively resets 1310 the first time duration element to indicate the deletion of the first contact record. For the third action, the device 102 detects 1318 an acceptance communication between the device 102 and the second contact, and responsively resets 1324 the first time duration element to indicate deletion of the first contact record. For the fourth action, the device 102 detects 1320 a declination communication between the device 102 and the second contact, and responsively resets 1322 the second time duration element to indicate the deletion of the second contact record.

More specifically, for the first and second actions, the device 102 detects 1302 an additional communication being sent to the first service provider. The device 102 parses 1304 the additional communication to determine if it is an acceptance or declination communication. If the device 102 detects 1306 that the additional communication to the first service provider is an acceptance communication, then the device 102 resets 1312 the second time duration element to indicate deletion of the second contact record for the second service provider. If the device 102 determines 1306 that the additional communication is not an acceptance communication, then the device 102 determines 1308 if the additional communication is a declination communication. If the additional communication to the first service provider is a declination communication, then the device 102 resets 1310 the first time duration element to indicate deletion of the first contact record for the first service provider. If the device 102 determines 1308 that the additional communication is neither an acceptance communication or a declination communication, then the device 102 waits to detect 1302 an additional communication being sent to the first service provider.

For the second and third actions, the device 102 detects 1314 an additional communication being sent to the second service provider. The device 102 parses 1316 the additional communication to determine if it is an acceptance or declination communication. If the device 102 detects 1318 that the additional communication to the second service provider is an acceptance communication, then the device 102 resets 1324 the first time duration element to indicate deletion of the first contact record for the first service provider. If the device 102 determines 1318 that the additional communication is not an acceptance communication, then the device 102 determines 1320 if the additional communication is a declination communication. If the additional communication to the second service provider is a declination communication, then the device 102 resets 1322 the second time duration element to indicate deletion of the second contact record for the second service provider. If the device 102 determines 1320 that the additional communication is neither an acceptance communication or a declination communication, then the device 102 waits to detect 1314 an additional communication being sent to the second service provider.

For an embodiment of the method 1200, when a single contact record with a temporary time duration remains for a service provider of the service, the device 102 performs the actions of the method 900 indicated in FIG. 10 for the remaining contact record. If the device 102 determines 1002 the temporary time duration expired or the device 102 determines 1004 the service provider completed the service, the device 102 prompts 1006 a user for feedback. If the device 102 determines 1008 that feedback is received, the device 102 determines 1012 if the feedback is positive or negative. If the device 102 determines 1012 the feedback is positive, then the device 102 resets 1016 the time duration element for the contact record to indicate an infinite time duration. If the device 102 determines 1012 the feedback is negative, then the device 102 resets 1014 the time duration element for the contact record to indicate deletion. If the device 102 does not detect 1008 feedback, it again prompts 1006 the user for feedback after waiting 1010 a predetermined amount of time. Alternatively, the length of time the device 102 waits 1010 can be determined in real time by an algorithm executed by the processing element 204.

For an example consistent with the method 1200, Heather Watson uses her smartphone 102 to send and receive communications to and from wedding coordinators regarding an upcoming wedding scheduled for a given date. In particular, Heather sends a communication to each of three different wedding coordinators to inquire about their pricing, availability, and services. As each wedding coordinator responds to Heather's inquiry, the smartphone 102 creates a contact record for that wedding coordinator upon detecting a pair of communications for the particular wedding coordinator.

For an embodiment, a response need not come from a same number or address the initial solicitation communication was sent to. The smartphone 102 associates the response communication with a wedding coordinator by associating the response communication with an initial solicitation communication. Heather might send a solicitation e-mail to "info@weddings.com," and she might receive an e-mail response from "mark@weddings.com." In a first example, the device 102 associates the response e-mail with the solicitation e-mail because both e-mails have the same domain name. In a second example, the device 102 associates the response e-mail with the solicitation e-mail because the solicitation e-mail is appended to the response e-mail. In a third example, the device 102 associates the response e-mail with the solicitation e-mail because the response e-mail references an element of the solicitation e-mail. For instance, within the response e-mail, Mark writes: "thank you for inquiring with weddings.com." The device 102 parses the response e-mail and associates it with a solicitation e-mail, and with a wedding coordinator, by identifying a common element in the pair of communications.

Heather has two ways of selecting a wedding coordinator to coordinate the upcoming wedding. She can accept the services of one wedding coordinator, or she can decline the services of all but one wedding coordinator. If the smartphone 102 detects an acceptance communication being sent to one of the three wedding coordinators, the smartphone 102 sets a property field for the contact record of that wedding coordinator to indicate a temporary time duration that expires after the wedding date. The smartphone 102 also sets the time duration elements for the other two wedding coordinators to indicate deletion of their contact records. For example, a property field of each contact record to be deleted is reset to the value "0".

If the smartphone 102 detects a declination communication being sent to one of the three wedding coordinators, the smartphone 102 sets a time duration element for the contact record of that wedding coordinator to indicate deletion of the contact record. When the smartphone 102 detects a declination communication being sent to a second wedding coordinator, the smartphone 102 sets a time duration element for the contact record of the second wedding coordinator to indicate deletion of the second wedding coordinator's contact record.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method performed by an electronic device for managing contact information, the method comprising:
   detecting a pair of communications by the electronic device related to a first contact, the pair of communications com nsm a first communication transmitted b the electronic device to the first contact and a second communication received by the electronic device from the first contact;
   parsing at least one of the pair of communications in the pair of communications to determine a first time duration for a first record for the first contact;
   setting a first time duration element for the first record based on the first time duration to cause deletion of the first record when the first time duration has elapsed, wherein the first time duration element initially indicates an indeterminate time duration; and
   after setting the first time duration element to the indeterminate time duration, updating the first time duration element to at least one of a temporary time duration or an infinite time duration.

2. The method of claim 1, wherein the deletion removes multiple records for the first contact.

3. The method of claim 1, wherein the detecting the pair of communications comprises:
   identifying an incoming communication and an outgoing communication.

4. The method of claim 3, wherein the detecting the pair of communications comprises:
   receiving a solicitation communication as the second communication from the first contact; and
   transmitting a response communication as the first communication to the solicitation communication.

5. The method of claim 4, wherein the parsing at least one of the pair of communications in the pair of communications comprises:
   parsing at least one of the solicitation communication or the response communication to determine a type of service offered by the first contact, wherein the first time duration is determined based on the type of service,
   wherein the first record indicates that the first time duration was determined based on the type of service.

6. The method of claim 4 further comprising:
   detecting an additional communication related to the first contact;
   determining from the additional communication that a service provided by the first contact is completed; and
   resetting, in response to determining the service is completed, the first time duration element from indicating the first time duration that causes the electronic device to delete the first record on a first date to indicate a second time duration that causes the electronic device to delete the first record on a second date that occurs before the first date.

7. The method of claim 4 further comprising:
   detecting an additional communication;
   parsing the additional communication to determine a second time duration for the first record; and
   resetting, based on the second time duration, the first time duration element from indicating the first time duration that causes the electronic device to delete the first record on a first date to indicate the second time duration that causes the electronic device to delete the first record on a second date that is different from the first date.

8. The method of claim 1, wherein the parsing at least one of the pair of communications in the pair of communications comprises:

parsing at least one of the solicitation communication or the response communication to determine that the first contact is providing a service, wherein the first time duration element is set to indicate the indeterminate time duration, the method further comprising:

determining from an additional communication by the electronic device that the service is completed;

receiving, in response to a user prompt, input comprising feedback on the service; and resetting, in response to the feedback, the first time duration element for the first record to indicate the infinite time duration.

9. The method of claim 1 further comprising:
transmitting a second solicitation communication to a second contact;
receiving a second response communication to the second solicitation communication;
creating a second record for the second contact; and
setting a second time duration element for the second record to indicate an indeterminate time duration.

10. The method of claim 9 further comprising at least one of:
detecting an acceptance communication between the electronic device and the first contact, and responsively resetting the second time duration element to indicate deletion of the second record; or
detecting a declination communication between the electronic device and the first contact, and responsively resetting the first time duration element to indicate deletion of the first record.

11. The method of claim 1, wherein the detecting the pair of communications comprises:
receiving an update communication that indicates an update to the first record; and
transmitting a confirmation communication to the first contact.

12. The method of claim 11, wherein the update communication indicates the first record, and the confirmation communication uses the first record.

13. The method of claim 12 further comprising:
resetting a second time duration element for an existing record for the first contact to indicate an indeterminate time duration;
detecting at least one additional communication in addition to the pair of communications;
parsing the at least one additional communication to determine a second time duration for the first record;
upon determining the second time duration is the infinite time duration, resetting the first time duration element for the first record to indicate the infinite time duration, and resetting the second time duration element for the existing record to cause deletion of the existing record; or
upon determining the second time duration is a temporary time duration, resetting the first time duration element for the first record to indicate the temporary time duration, and resetting the second time duration element for the existing record to indicate the infinite time duration.

14. The method of claim 1, wherein setting the time duration element comprises at least one of:
using a property for the first record that is blank;
setting, in a property for the first record, a text string to indicate the indeterminate time duration; or
resetting the property for the first record.

15. An electronic device configured to manage contact information, the electronic device comprising:
a receiver configured to receive communications;
a transmitter configured to send communications; and
a processing element operatively coupled to the receiver and the transmitter, wherein the processing element is configured to:
detect a pair of communications by the electronic device related to a contact, the pair of communications comprising a first communication transmitted by the electronic device to the first contact and a second communication received by the electronic device from the first contact;
parse at least one of the pair of communications in the pair of communications to determine a time duration for a record for the contact;
set a time duration element for the record based on a result of the parsing, wherein the first time duration element initially indicates an indeterminate time duration; and
after setting the first time duration element to the indeterminate time duration, update the first time duration element to at least one of a temporary time duration or an infinite time duration.

16. The electronic device of claim 15, wherein the time duration element is updated to indicate a temporary time duration, and the processing element is further configured to delete the record after expiration of the temporary time duration.

17. The electronic device of claim 15 further comprising:
a user interface operatively coupled to the processing element, wherein the user interface is configured to present output and accept input, and wherein the processing element is configured to use the user interface to present a prompt for input used to determine a time duration for resetting the time duration element.

18. The electronic device of claim 15, wherein the processing element is further configured to reset the time duration element for the record from indicating the indeterminate time duration to indicating a temporary time duration based on at least one communication received in addition to the pair of communications.

19. The electronic device of claim 15, wherein to set the time duration element for the record, the processing element is further configured to:
use a property for the first record that is blank;
set, in a property for the first record, a text string to indicate the indeterminate time duration; or
reset the property for the first record.

* * * * *